(12) United States Patent
Roberjot et al.

(10) Patent No.: US 6,988,401 B2
(45) Date of Patent: Jan. 24, 2006

(54) SEAL FOR A FLUID METER AND A METER EQUIPPED THEREWITH

(75) Inventors: Eric Roberjot, Monod (FR); Christophe Depeyre, Macon (FR)

(73) Assignee: Actaris SAS, Boulogne Billancourt (FR)

( * ) Notice: Subject to any disclaimer, the term of this patent is extended or adjusted under 35 U.S.C. 154(b) by 0 days.

(21) Appl. No.: 10/763,062

(22) Filed: Jan. 22, 2004

(65) Prior Publication Data

US 2004/0206173 A1 Oct. 21, 2004

(30) Foreign Application Priority Data

Jan. 31, 2003 (FR) .................... 03 01141

(51) Int. Cl.
*G01F 3/30* (2006.01)
(52) U.S. Cl. .......................... 73/252; 73/234
(58) Field of Classification Search ............... 277/590, 277/431; 425/500; 73/234, 252; 429/78; 215/233

See application file for complete search history.

(56) References Cited

U.S. PATENT DOCUMENTS

| | | | | |
|---|---|---|---|---|
| 4,545,585 A | * | 10/1985 | Buse | 277/431 |
| 4,781,312 A | * | 11/1988 | Strazdins | 222/309 |
| 5,346,379 A | * | 9/1994 | Wolfl et al. | 425/67 |
| 6,657,718 B1 | * | 12/2003 | Petersen et al. | 356/246 |

* cited by examiner

*Primary Examiner*—Edward Lefkowitz
*Assistant Examiner*—Jewel V. Thompson
(74) *Attorney, Agent, or Firm*—Sofer & Haroun, LLP

(57) ABSTRACT

A seal is mounted in a groove around an orifice of a measuring chamber inserted in an insertion direction into a tank to form a fluid meter. The seal comprises a radially elastic torus having a shape corresponding to that of the orifice and an arrangement on at least one of its sides substantially parallel to the insertion direction for immobilizing it in a direction opposite the insertion direction.

4 Claims, 3 Drawing Sheets

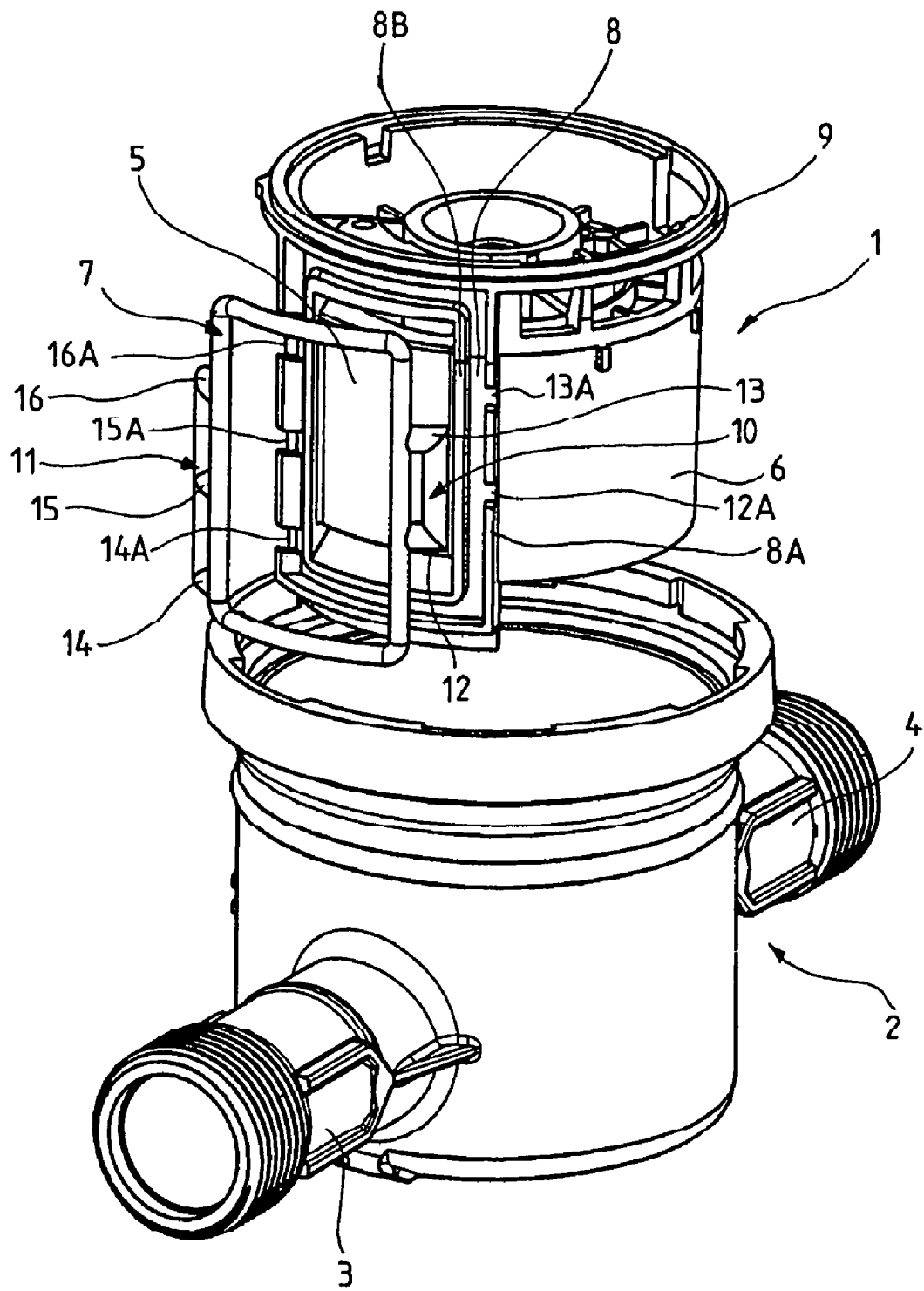
FIG_1

FIG_2
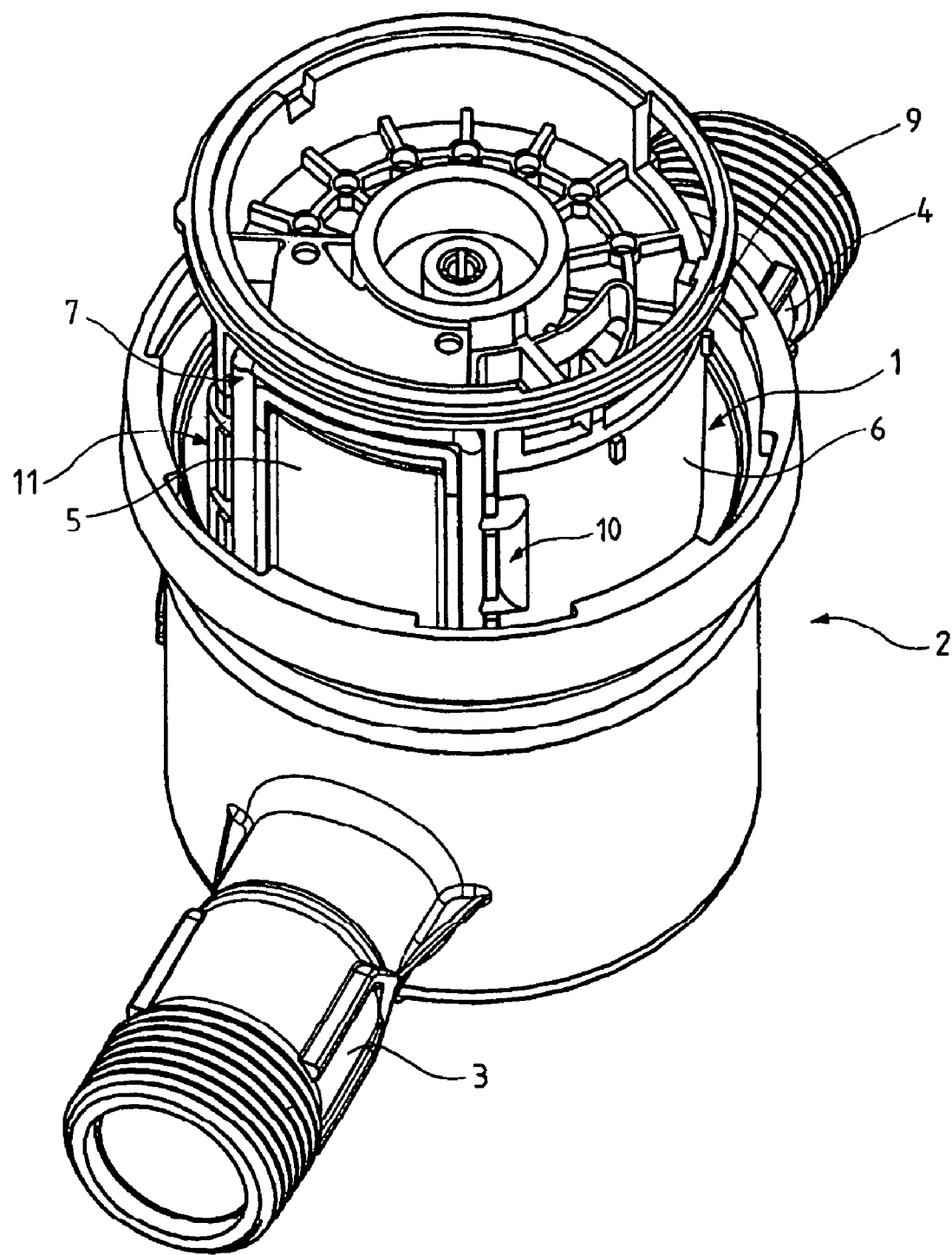

FIG_3
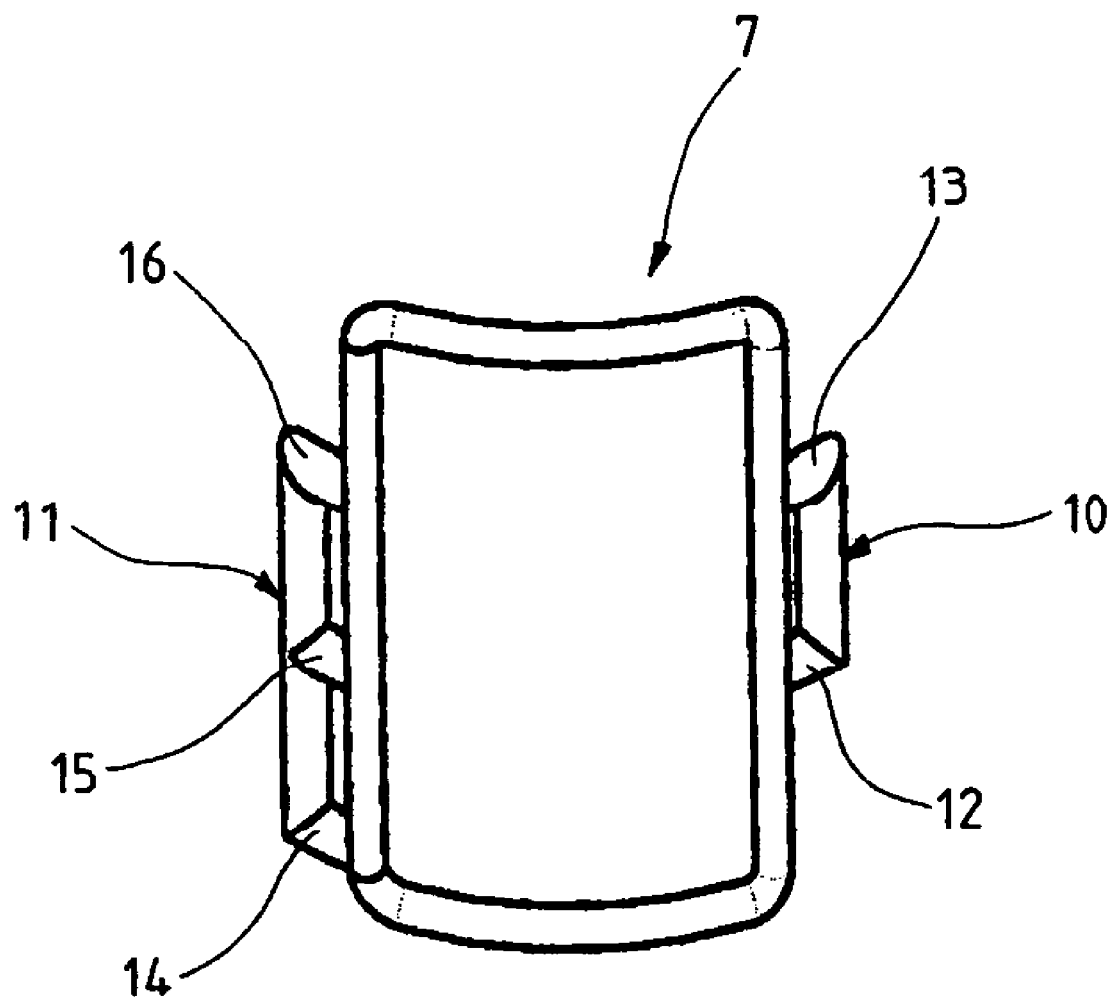

SEAL FOR A FLUID METER AND A METER EQUIPPED THEREWITH

RELATED APPLICATION

This application is related to and claims the benefit of priority from French Patent Application No. 03 01141, filed on Jan. 31, 2003, the entirety of which is incorporated herein by reference.

BACKGROUND OF THE INVENTION

1. Field of the Invention

The present invention relates to a seal for a fluid meter and to a meter equipped with the seal.

It relates in particular to a water meter with a volumetric measuring chamber.

2. Description of the Prior Art

A prior art meter of the above kind comprises a casing or tank having an inlet pipe and an outlet pipe into which is inserted an oscillatory piston type volumetric measuring chamber. The measuring chamber has at least one inlet orifice and at least one outlet orifice. This kind of meter is well known to the person skilled in the art.

In some arrangements of the measuring chamber, the inlet orifice or the outlet orifice is provided at a particular height on the lateral wall of the envelope of the chamber. This orifice must be connected in sealed fashion to the corresponding inlet or outlet pipe, and to this end a seal is fitted into a groove formed around the orifice on the external face of the envelope of the chamber. Once the measuring chamber has been placed in the tank, the seal is clamped into the slot between the measuring chamber and the tank and ensures sealed flow of the fluid between the orifice and the corresponding pipe.

The prior art seal is a generally rectangular O-ring whose shape corresponds to that of the orifice.

Assembly is effected by placing the seal in its groove on the measuring chamber and then inserting the measuring chamber into the tank.

To provide a seal, the diameter of the unstressed seal is greater than the width of the slot between the measuring chamber and the tank. Upon inserting the measuring chamber, the seal is therefore subjected to forces in a direction opposite to the direction in which the measuring chamber is inserted into the tank. These relatively high forces can expel the seal from the groove, the seal then separating from the measuring chamber, with the risk of the measuring chamber being assembled to the tank with no seal, making the meter useless, or deform it in the direction opposite to the insertion direction, or even cut it. These problems are incompatible with mass production assembly of the meter.

SUMMARY OF THE INVENTION

The invention solves the above problems and to this end proposes a seal adapted to be mounted in a groove around an orifice of a measuring chamber inserted in an insertion direction into a tank to form a fluid meter, the seal comprising a radially elastic torus having a shape corresponding to that of the orifice and an arrangement on at least one of its sides substantially parallel to the insertion direction for immobilizing it in a direction opposite the insertion direction.

The invention has the advantage that it also holds the seal in place on the measuring chamber or the tank during handling thereof prior to assembly.

Moreover, assembly becomes compatible with mass production assembly quality and productivity constraints, with no additional operations other than inserting the measuring chamber into the tank.

The immobilizing arrangement preferably comprises at least one seal section substantially perpendicular to the insertion direction and in this case may comprise at last one U-shaped seal section fastened to the seal at both ends.

The invention also proposes a fluid meter comprising a measuring chamber adapted to be inserted in an insertion direction into a tank and comprising at least one orifice and a seal as defined hereinabove mounted in a groove around the orifice having two walls integral with the measuring chamber or the tank, in which fluid meter the immobilizing arrangement is nested in at least one opening in one of the walls of the groove.

In a preferred embodiment said immobilizing arrangement comprises at least one seal section substantially perpendicular to said insertion direction and nested in said opening and in this case it may comprise at least one U-shaped seal section fastened to the seal at both ends and adapted to be nested in said two openings.

Said groove is advantageously on the exterior wall of the measuring chamber.

The invention is described in more detail hereinafter with the aid of figures showing a preferred embodiment of the invention.

BRIEF DESCRIPTION OF THE DRAWINGS

FIG. 1 is a view of a meter according to the invention prior to assembly.

FIG. 2 is a view of a meter according to the invention during assembly.

FIG. 3 is a perspective view of a seal conforming to the invention.

DETAILED DESCRIPTION OF THE PREFERRED EMBODIMENT

As shown in FIGS. 1 and 2, a fluid meter comprises an oscillatory piston type volumetric measuring chamber 1 inserted in an insertion direction into a tank 2 carrying an inlet pipe 3 and an outlet pipe 4.

The external envelope 6 and the cover 9 of the measuring chamber form an orifice 5 at a particular height on the lateral wall of the chamber that has to be connected in sealed fashion to the inlet pipe 3; to this end, a seal 7 consisting of a radially elastic torus of generally rectangular shape, like the orifice, is fitted into a groove 8 around the orifice 5 on the external face of the envelope 6 of the chamber.

In accordance with the invention, and as can be seen in FIG. 3 in particular, the seal 7 includes an immobilizing arrangement in a direction opposite the insertion direction on its sides that are substantially parallel to the insertion direction. This immobilizing arrangement comprises seal sections 12 to 16 substantially perpendicular to the insertion direction, to be more precise perpendicular to the corresponding sides of the O-ring, formed by the branches of at least one U-shaped seal section 10, 11 fastened to the seal at both ends, the core of the U-shaped section stiffening the immobilizing arrangement.

As shown in the figures, the two U-shaped seal sections 10, 11 are advantageously asymmetrical, to act as a polarizer, to ensure assembly with the seal the right way round. This is particularly important in the case of mass production assembly.

The groove around the orifice 5 has two walls 8A, 8B molded into the exterior envelope 6 and the cover 9 of the measuring chamber. The exterior wall 8A of the groove includes openings 12A to 16A.

The components are assembled by first nesting the seal 7 in the groove 8 with the seal sections 12 to 16 nested in the corresponding openings 12A to 16A. This immobilizes the seal in a direction parallel to the axis of symmetry of the measuring chamber 1.

The measuring chamber 1 equipped with the seal 7 is then inserted into the tank 2 in an insertion direction parallel to its axis of symmetry, as shown in FIG. 2.

The foregoing description relates to an inlet orifice 5 that has to communicate with the inlet pipe 3 of the tank, but the invention applies equally to an outlet orifice of the same type that has to communicate with the outlet pipe 4 of the tank, of course.

Moreover, in the embodiment described, the seal is mounted in a groove on the measuring chamber but, in accordance with the same principle, the groove could be on the tank.

There is claimed:

1. A fluid meter having a measuring chamber adapted to be inserted in an insertion direction into a tank; said fluid meter comprising:

at least one orifice for passage of fluid; and
a seal having a radially elastic torus having a shape substantially corresponding to that of said orifice; and an arrangement extended away from at least one of the sides of said seal, said arrangement being substantially parallel to said side of said seal and said insertion direction, so as to immobilize said seal in a direction opposite said insertion direction, wherein said seal is mounted in a groove around said orifice having two walls integral with said measuring chamber of said tank, in said fluid meter, said immobilizing arrangement is nested in at least one opening in one of said walls of said groove.

2. The meter claimed in claim 1, wherein said immobilizing arrangement further comprises at least one seal section substantially perpendicular to said insertion direction and nested in said opening.

3. The meter claimed in claim 2, wherein said immobilizing arrangement is formed as at least one U-shaped seal section fastened to said seal at both ends and nested in said two openings.

4. The meter claimed in claim 1 wherein said groove is on an exterior wall of said measuring chamber.

* * * * *